United States Patent
Nielsen

(10) Patent No.: US 11,785,957 B2
(45) Date of Patent: Oct. 17, 2023

(54) METHOD AND SYSTEM FOR PROCESSING FISH PORTIONS

(71) Applicant: Ishida Europe Limited, Birmingham (GB)

(72) Inventor: Ulrich Carlin Nielsen, Birmingham (GB)

(73) Assignee: Ishida Europe Limited, Birmingham (GB)

( * ) Notice: Subject to any disclaimer, the term of this patent is extended or adjusted under 35 U.S.C. 154(b) by 0 days.

(21) Appl. No.: 17/858,038

(22) Filed: Jul. 5, 2022

(65) Prior Publication Data

US 2022/0346391 A1 Nov. 3, 2022

Related U.S. Application Data

(63) Continuation of application No. 17/253,072, filed as application No. PCT/GB2019/051718 on Jun. 19, 2019, now Pat. No. 11,395,500.

(30) Foreign Application Priority Data

Jun. 19, 2018 (GB) ..................................... 1810055

(51) Int. Cl.
*A22C 17/00* (2006.01)
*A22C 21/00* (2006.01)

(52) U.S. Cl.
CPC ........ *A22C 17/002* (2013.01); *A22C 17/0073* (2013.01); *A22C 21/003* (2013.01)

(58) Field of Classification Search
CPC .. A22C 17/002; A22C 17/0073; A22C 21/003
(Continued)

(56) References Cited

U.S. PATENT DOCUMENTS 7,156,730 B1 * 1/2007 Blaine .................. A22C 17/002
452/150
8,643,851 B2 2/2014 Weber
(Continued)

FOREIGN PATENT DOCUMENTS

CN 102421297 A 4/2012
CN 107993203 A 5/2018
(Continued)

OTHER PUBLICATIONS

Third Office Action issued in corresponding Chinese Patent Application No. 2019800411404, dated Dec. 5, 2022, with English translation thereof.
(Continued)

*Primary Examiner* — Richard T Price, Jr.
(74) *Attorney, Agent, or Firm* — SQUIRE PATTON BOGGS (US) LLP

(57) ABSTRACT

A method of processing fish portions determines at a control unit a target weight of a cut fish portion; inspects a fish portion using an inspection unit to determine a mass distribution of said fish portion and providing said mass distribution to the control unit; calculates a cutting plan of the poultry fish portion based on the target weight and the mass distribution using the control unit; uses a mechanical gripper so as to grip the fish portion and arrange said poultry fish portion for execution of the cutting plan; and cuts the fish portion using a cutting unit in accordance with the cutting plan so as to produce a cut fish portion in accordance with the target weight. A system for processing fish portions is configured to perform the foregoing method, among others.

20 Claims, 7 Drawing Sheets

(58) Field of Classification Search
USPC .......................................................... 452/155
See application file for complete search history.

(56) References Cited

U.S. PATENT DOCUMENTS

| | | |
|---|---|---|
| 2003/0036344 A1 | 2/2003 | Sigurdsson et al. |
| 2004/0134319 A1 | 7/2004 | Sandberg |
| 2009/0137195 A1 | 5/2009 | Bottemiller et al. |
| 2015/0205288 A1* | 7/2015 | Strong .................. A22C 17/002 700/114 |
| 2017/0210023 A1 | 7/2017 | Hocker et al. |
| 2019/0200626 A1* | 7/2019 | Tobias Granado .......................... A22C 21/0046 |
| 2020/0254641 A1* | 8/2020 | Hocker .............. A22C 17/0093 |
| 2020/0288729 A1 | 9/2020 | Blaine et al. |

FOREIGN PATENT DOCUMENTS

| | | |
|---|---|---|
| EP | 3 045 882 A1 | 7/2016 |
| GB | 2 427 121 A | 12/2006 |
| JP | 2013-46636 A | 3/2013 |
| JP | 2017-526340 A | 9/2017 |
| WO | WO 98/35797 A1 | 8/1998 |
| WO | WO 2007/022782 A2 | 3/2007 |
| WO | WO 2007/067052 A2 | 6/2007 |
| WO | WO 2010/114397 A1 | 10/2010 |
| WO | WO 2015/198062 A1 | 12/2015 |
| WO | WO 2016/139661 A2 | 9/2016 |

OTHER PUBLICATIONS

Notice of Reasons for Refusal issued in corresponding Japanese Patent Application No. 2020-570906, dated Jun. 20, 2023, with English translation thereof.

* cited by examiner

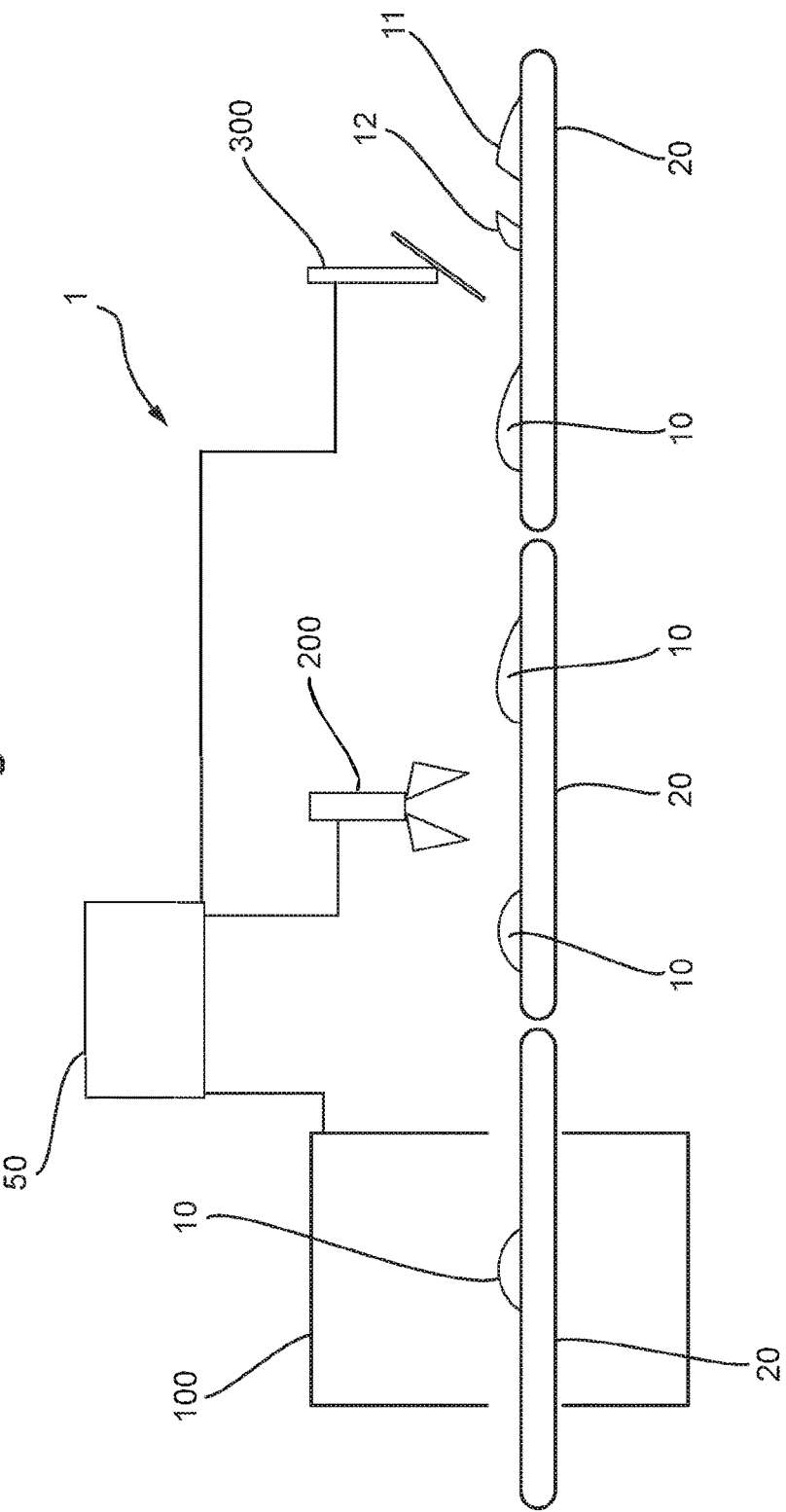

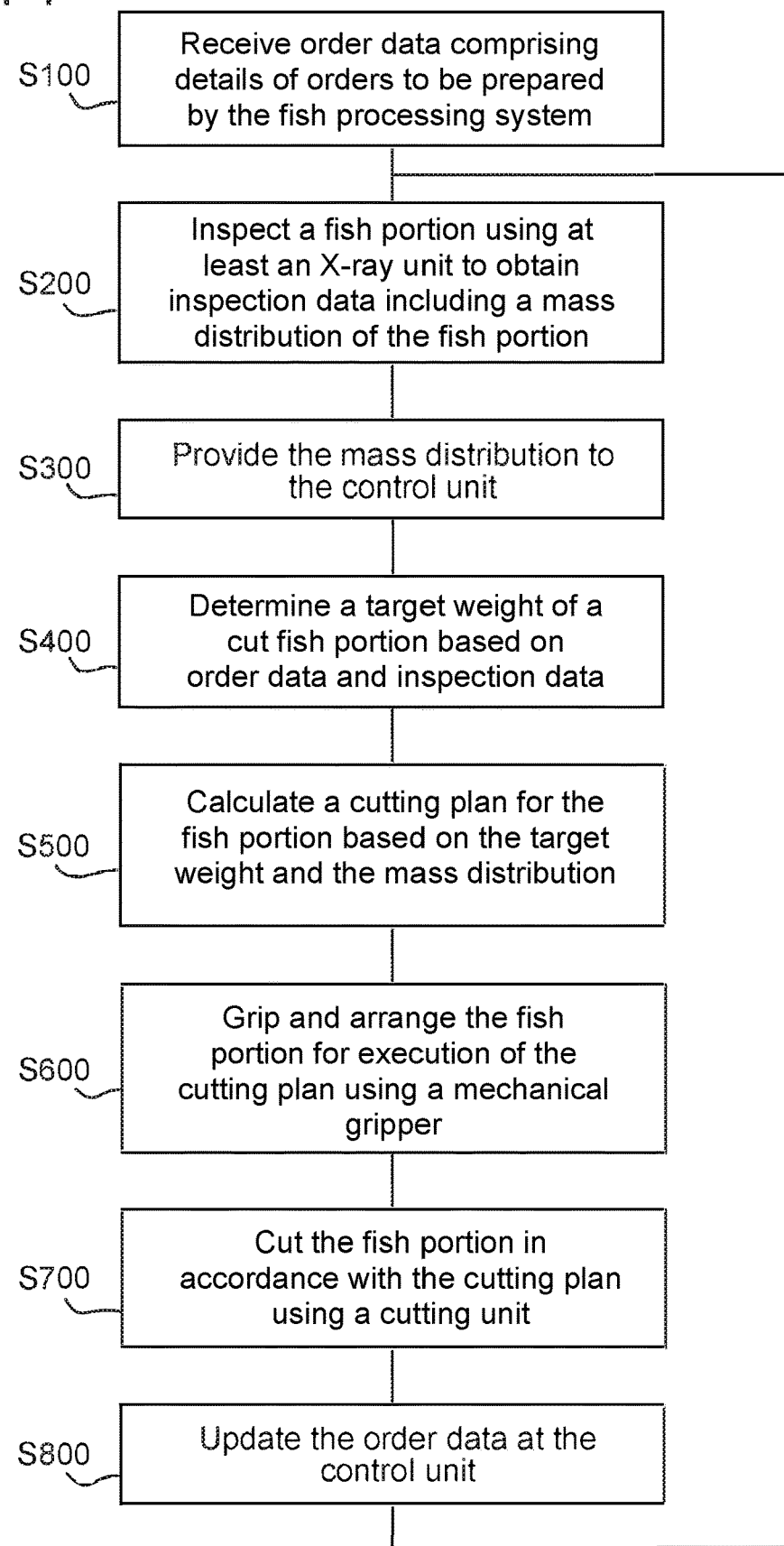

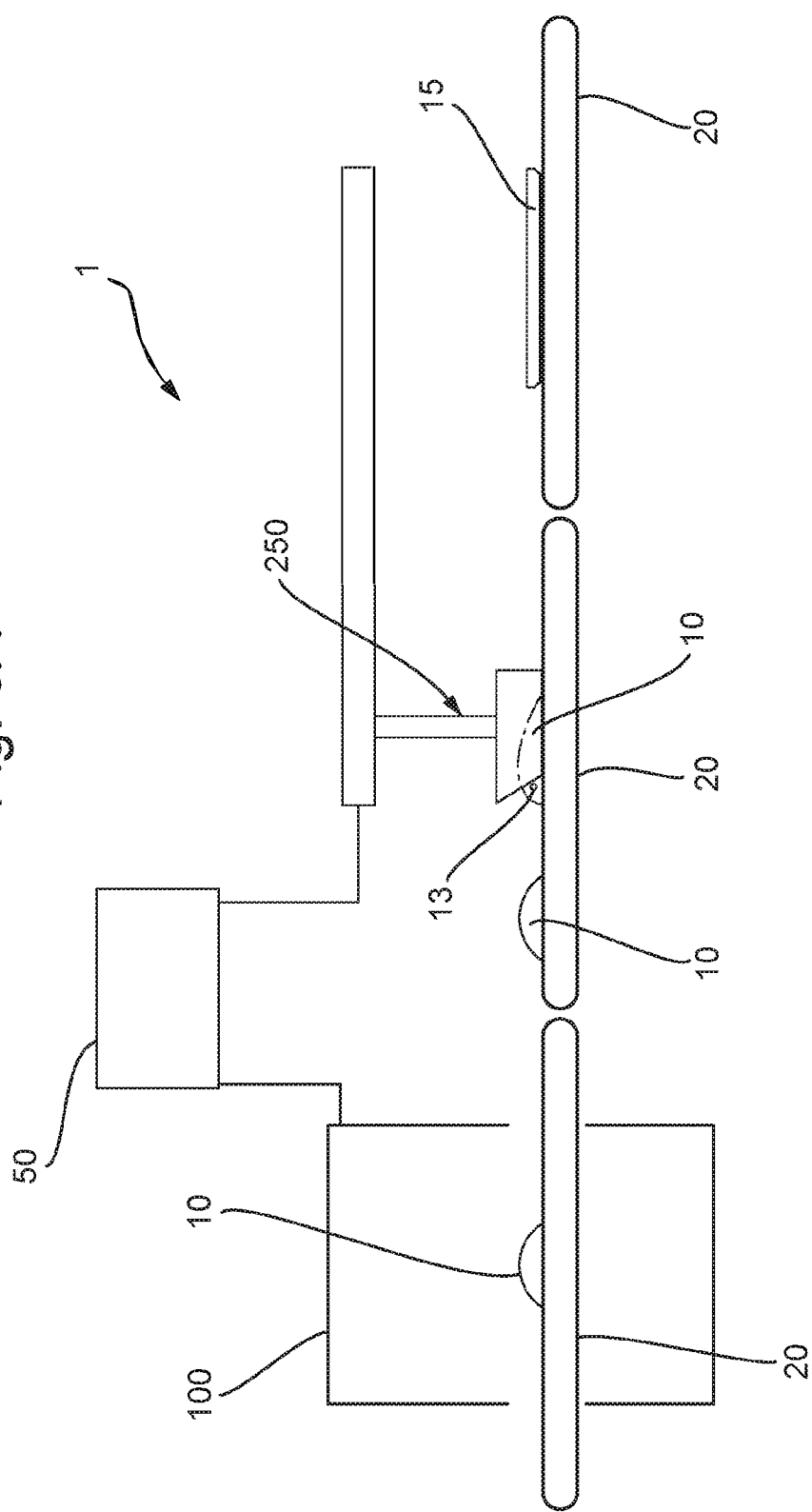

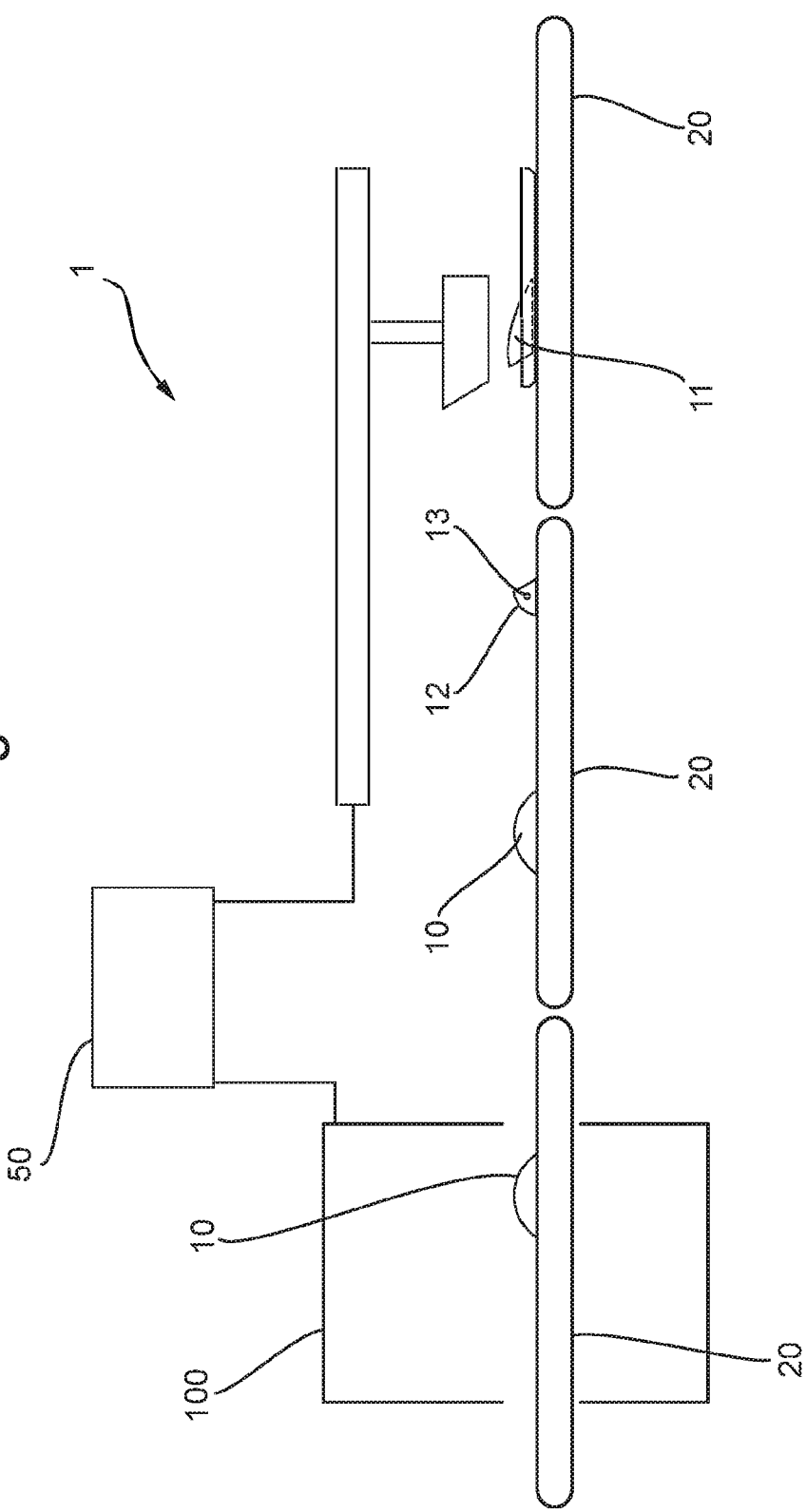

METHOD AND SYSTEM FOR PROCESSING FISH PORTIONS

CROSS-REFERENCE TO RELATED APPLICATIONS

This application is a continuation of U.S. application Ser. No. 17/253,072, filed Dec. 16, 2020, which is a national-stage filing under 37 USC 371(c) of International Application No. PCT/GB2019/051718, filed Jun. 19, 2019, which claims priority to and the benefit of Great Britain Patent Application GB1810055.2, filed Jun. 19, 2018, the entire contents of each of which are herein incorporated by reference in their entirety for all purposes.

FIELD OF THE INVENTION

The present invention is directed to a method of processing poultry portions, in particular chicken breast, and systems for processing said poultry portions.

DESCRIPTION OF THE RELATED ART

It is common for poultry portions, such as chicken breasts, to be processed by cutting or trimming in order to better fulfil particular order requirements. Cutting and trimming is commonly performed so that cut poultry portions meet weight requirements, in particular. For example, a particular requirement in the art is that cut poultry portions have a weight corresponding to a single meal portion. Processing can also involve trimming the poultry portion to remove foreign objects, such as fat and bone pieces. In other specific cases, portions may be cut down to a size suitable for fulfilling part of an order for a batch of poultry portions, e.g. for a batch of chicken breasts weighing 750 grams.

Many automated systems have been developed for the processing of poultry portions in order to reduce labor costs, increase the accuracy with which portions can be cut, reduce wastage of product though offcuts, minimize giveaway though oversized products and increase processing speed. Typically, the most efficient way of trimming a poultry portion down to a desired weight will involve making a cut that is unique to that poultry portion and a common way of accommodating these unique cutting plans has been to provide complex robot arms for cutting along any desired cutting line. An example of a known system for trimming poultry portions may be found in WO 2015/198062 A1. In this system, a complex robot cutting arm with water jet is used to trim poultry portions so as to remove foreign objects. However, such robot arms are incredibly expensive and so prevent wider adoption of these more efficient methods of processing poultry portions. It is therefore an object of the present invention to provide an improved method for processing poultry portions that does not involve expensive and complex robotic cutting arms, while maintaining the benefits associated with customized cutting plans for individual poultry portions.

SUMMARY OF INVENTION

According to a first aspect of the present invention, there is provided a method of processing poultry portions comprising: determining at a control unit a target weight of a cut poultry portion; inspecting a poultry portion using an inspection unit to determine a mass distribution of said poultry portion and providing said mass distribution to the control unit; calculating a cutting plan of the poultry portion based on the target weight and the mass distribution using the control unit; using a mechanical gripper so as to grip the poultry portion and arrange said poultry portion for execution of the cutting plan; and cutting the poultry portion using a cutting unit in accordance with the cutting plan so as to produce a cut poultry portion in accordance with the target weight. It has been identified that the processing of poultry portions can be made more cost effective by using a mechanical gripper to grip the poultry portion and arrange the poultry portion relative to a cutting unit for execution of a cutting plan. The use of such a mechanical gripper to arrange a poultry portion prior to cutting allows more complex cutting plans to be executed by a relatively simple cutting unit.

While the present method is directed to the processing of poultry portions, it is also envisaged that the method could be applied to other types of food portions, such as fish portions and meat portions.

The target weight may be a single value, e.g. 160 grams, or may be a range, e.g. 150 to 160 grams. In some simple scenarios, the target weight for each cut poultry portion may be a single value that is fixed for each poultry portion. However, in the majority of cases, a number of factors contribute towards the determination of the target weight and these will be described below. It should be noted, however, that the determination of the target weight may be made at any stage before calculating the cutting plan and indeed in some embodiments the inspection data, e.g. the mass distribution, may be one of the factors used to determine a target weight. Similarly, the mechanical gripper may have already received the poultry portion before the target weight is determined.

It should also be noted at this stage that the mechanical gripper and the cutting unit will typically be controlled by the control unit to execute the above mentioned tasks.

A common type of order for poultry portions is a batch of poultry portions, with each batch having a target weight. For example, it is common to purchase batches of chicken breast fillets in packages having a set weight. In order to efficiently accommodate batch weight requirements, preferably the method comprises forming a batch of poultry portions, and the target weight is determined based on a target batch weight and a weight of a present incomplete batch. The target batch weight will typically be the weight associated with a particular order. For example, an order might be for a 1000 batches of chicken breast fillets, each batch having a weight of 750 grams, in which case the target batch weight may be 750 grams. Again, any tolerances in batch weight may be accommodated by a target batch weight that is a range of weights, e.g. 740 to 760 grams. The weight of a present incomplete batch may be the weight of a batch currently being prepared. This may be 0 grams if no portions have yet been allocated to a batch, or may be some non-zero value less than the target batch weight. For example, if a particular batch has a present incomplete weight of 590 grams and a target batch weight of 750 grams, a target weight might be determined as 160 grams for completing the batch. In this situation, the method comprises calculating the target weight as the weight required to complete the batch, before inspecting the poultry portion and calculating a cutting plan required to achieve said target weight.

Some orders may require a particular number of poultry portions in a batch of poultry portions. For example, an order might be 1000 batches, each having four chicken breast portions with a total batch weight of 750 grams. Therefore, preferably the target weight is determined based on a target number of poultry portions in said batch and a number of poultry portions in said present incomplete batch. It should be noted here that the target number of poultry portions may again be a range, e.g. three to five poultry portions. By including a target number of poultry portions in the determination of target weight, it is possible to prevent incomplete batches of poultry portions being produced that cannot be completed by incoming poultry portions.

Preferably, the target weight is determined based on a weight of said poultry portion and/or based on a weight of one or more poultry portions located upstream of said poultry portion. Including the weight of the incoming poultry portions in the determination of the target weight can prevent, for example, very large poultry portions being used to produce small cut poultry portions, which would result in a large amount of the lower value offcut poultry being produced. Including the weight of upstream poultry portions in the determination also allows the system to be sensitive to variations in the weight of incoming poultry portions and to more efficiently use incoming poultry. For example, the method may take into account that upstream poultry portions are relatively small and so increase the target weight for the poultry portion in question so that the incoming smaller poultry portions can be accommodated into a particular batch.

The above has focused on the determination of a single target weight for a single poultry portion. However, it will be appreciated that this method will be repeated for each subsequently received poultry portion. For example, the method may include determining a target weight for a subsequent cut poultry portion, said new target weight being determined based on at least the target batch weight and an updated weight of a present incomplete batch, and optionally based on a target number of poultry portions in said batch and updated number of poultry portions in said present incomplete batch and further optionally based on a weight of a subsequent poultry portion and/or a weight of one or more poultry portions located upstream of said subsequent poultry portion. For example, the updated weight of the present incomplete batch may be determined by adding a previous target weight to the previous present incomplete batch weight. Alternatively, the incomplete batch may be weighed to update the weight of the present incomplete batch. In a yet further alternative, each cut poultry portion may be weighed after cutting and before being included in the batch to confirm the precise weight of the poultry portion and maintain a running total weight for the batch.

In some embodiments, determining the target weight is based on one of a target minimum offcut weight, a target maximum offcut weight and a target offcut weight. Offcut is the part of the poultry portion, usually the smaller part of the divided poultry portion, that is used for secondary products, such as nuggets or processed foods. Offcut is generally of lower value than the cut poultry portion otherwise formed as part of the cutting plan. Therefore, it is typically desirable to ensure offcut does not go beyond a target maximum weight. On the other hand, in some cases, offcut material below a certain weight will have more limited uses further decreasing its value or requiring the offcut to be rejected entirely. Therefore some embodiments include a target minimum offcut weight for achieving an offcut that can be used for a preferred offcut product, although this may be ignored in cases when the offcut cannot be used, e.g. when there is a bone fragment in the offcut. In some specific cases, it may be desirable to achieve offcut having a specified weight and this may be factored into the determination of the target weight. For example, offcut may be used as chicken pieces, which have higher value if they can be sold together in batches with each piece having similar weight. By considering the value of the offcut when determining the target weight, the overall value extracted from the poultry portion may be maximized, increasing cost effectiveness.

While the control unit may simply prioritize different types of order, e.g. prioritize orders for cut poultry portions over orders for chicken pieces made from offcut, in some embodiments, the control unit is also provided with value data, which may include the value associated with cut poultry portions and different sized offcuts.

The determination of the target weight may then be based also on the value data. For example, a batch order for cut poultry portions may have a value of £4 per kilogram of poultry, while an order for chicken pieces using offcut may have a value of £2 per kilogram and processed food orders using offcut a value of £1 per kilogram of poultry. The determination of the target weight may take these values into account in order to extract the most value from the incoming poultry portion.

There are a number of ways in which the poultry portion may be inspected. In some embodiments, the inspection unit comprises a weighing unit and inspecting the poultry portion comprises weighing said poultry portion with the weighing unit. In a very simple embodiment, the weight determined by the weighing unit may be used in conjunction with a typical model of a chicken breast portion to estimate a mass distribution of the poultry portion. However, in the majority of cases, a weight would be used in conjunction with an imaging means, which will be discussed below.

The method may comprise an inspection unit comprising an imaging unit and inspecting the poultry portion comprises imaging said poultry portion with the imaging unit so as to determine a volume distribution of said poultry portion. In some simplified cases, the volume distribution may be used in conjunction with a an average mass density of the type of poultry portion being processed to establish a mass distribution. However, preferably such an embodiment would be combined with a weighing unit as detailed above.

In particular, the combination of a weighing unit and an imaging unit as described above would allow for a more accurate mass distribution to be established and therefore improve the accuracy of the cutting plan.

In a yet further preferred embodiment, the inspection unit comprises a scanning unit, such as an ultrasound unit or an x-ray unit, and inspecting the poultry portion comprises scanning said poultry portion with the scanning unit. That is, it is preferred that there is provided a scanning unit capable of directly measuring a mass distribution of a poultry portion. For example, as mentioned, an x-ray unit may be used to generate a mass map representing the poultry portion. Such scanner units will typically further increase the accuracy of the mass distribution and therefore allow for more accurate cutting plans to be calculated. For example, such scanning units will typically accommodate variations in mass density throughout the poultry portion, which may then be accounted for in the cutting plan.

As will be clear from the above, the inspection unit may comprise a number of individual units that gather respective sets of inspection data and indeed the weighing, imaging and scanning units mentioned above may be used in conjunction with one another. The inspection unit may also comprise other devices for gathering other types of inspection data, such as a camera for inspecting for blood spots.

With poultry portions such as chicken breast in particular, it is typically preferred that the cutting plan is tailored to the anatomy of the particular type of poultry portion. For example, with chicken breast, it is preferred that offcuts are made at the thicker end of the chicken breast and proximate the inner facing surface of the chicken breast such that the external appearance is maintained. Therefore, preferably, inspecting the poultry portion comprises identifying a predetermined anatomical region of said poultry portion, and calculating the cutting plan is based on the mass distribution and the predetermined anatomical region. For example, calculating the cutting plan may comprise identifying a cutting line within the predetermined anatomical region that produces a cut poultry portion that meets the target weight. In this case, using the example of the chicken breast fillet, the predetermined anatomical region may be the region at the thicker end of the chicken breast fillet and proximate the inner facing side of the chicken breast fillet. It will be appreciated here that cutting line means the two dimensional area defined through the poultry portion that divides the poultry portion in two. This area may be planar or may have a more complex shape.

Another means of ensuring the cutting plan maintains external appearance, particularly in chicken breast, comprises inspecting the poultry portion so as to identify a major axis of the poultry portion, wherein calculating the cutting plan comprises calculating a cutting line relative to the major axis. For example, the cutting plan may require a cutting line with a predetermined angular range relative to the major axis. In particular, calculating a cutting line relative to the major axis comprises calculating a cutting line defining a generally acute angle relative to the major axis.

In an alternative embodiment, calculating a cutting line relative to the major axis comprises calculating a cutting line generally defining a plane parallel to the major axis. This may be used to trim, for example, a constant thickness off an inner facing surface of a chicken breast. This represents one way of reducing a weight of a poultry portion while achieving a high-value offcut product. For example, this cutting arrangement may maintain the outward facing appearance of a chicken breast and achieve an offcut that may be used, for example, for offcut product such as schnitzel.

In some preferred embodiments, the method further comprises inspecting the poultry portion so as to identify a presence and a location of a foreign object, such as a bone fragment, within the poultry portion and calculating the cutting plan is further based on the location of the foreign object. That is, the cutting plan may be required to include the foreign object in the offcut so as to ensure the cut poultry portion is free of foreign objects. Furthermore, determining the target weight may be based on the presence of the foreign object. For example, the control unit may aim to minimize the size of the offcut so that the offcut with foreign object can be rejected as waste while minimizing the lost value. If, in contrast, a sizable offcut was produced, it may be necessary to either further process the offcut to remove the foreign object and salvage a usable portion of the offcut, or to reject the larger offcut and lose an increased value of usable offcut poultry, both of which are less cost effective.

Typically, using the mechanical gripper so as to arrange said poultry portion for execution of the cutting plan will comprise moving the poultry portion relative to the cutting unit. For example, the mechanical gripper may convey the poultry portion to the cutting unit and place the poultry portion in a required position or orient the poultry portion as required so that the cutting unit may execute the cutting plan.

In some embodiments, the method further comprises conveying the poultry portion to the mechanical gripper using a conveying unit and preferably further comprises lifting the poultry portion off said conveying unit using the mechanical gripper. Lifting the poultry portion, in particular during cutting, may prevent the cutting unit from damaging the conveyer unit. Alternatively, arranging said poultry portion for execution of the cutting plan may comprise moving, or reorienting, the poultry portion on said conveying unit, and said conveying unit is subsequently used to convey the poultry portion to the cutting unit. In these embodiments, the mechanical gripper may place the poultry portion in such a way that when it arrives at the cutting unit it is in a position that allows execution of the cutting plan.

Preferably, the method comprises cutting the poultry portion while said poultry portion is gripped by the mechanical gripper. This increases the accuracy with which the cutting plan can be executed as the poultry portion is inhibited from moving during cutting by the mechanical gripper.

In many embodiments, to minimize the cost associated with the cutting unit, the cutting unit is configured to cut along a predetermined cutting direction and arranging the poultry portion comprises arranging said poultry portion relative to the predetermined cutting direction such that the cutting unit is able to cut the poultry portion in accordance with the cutting plan.

Preferably, the mechanical gripper is also used as part of the sorting and conveying of the cut poultry portions. For example, preferably the method comprises gripping the poultry portion at a pickup location using the mechanical gripper and depositing the cut poultry portion at a deposit location, separate from the pickup location, using the mechanical gripper. In particular, where the method comprises forming a batch of poultry portions, preferably the deposit location is a package for the batch of poultry portions. That is, the mechanical gripper may serve the additional function of arranging cut poultry portions into batches in respective packages. This may further reduce the cost of the system for implementing the method as no separate robot arms are required for sorting and packing batches of poultry portions. For example, the mechanical gripper may pick up a poultry portion and hold the poultry portion during execution of the cutting plan. The offcut may thereby be separated from the cut poultry portion that is retained in the mechanical gripper. The mechanical gripper may then transfer the cut poultry portion directly into a package for a batch of poultry portions.

In some embodiments, the mechanical gripper comprises a weighing unit and the method further comprises weighing the cut poultry portion with the mechanical gripper after execution of the cutting plan. This embodiment allows for the mechanical gripper to confirm that the cutting plan was executed to an acceptable degree of accuracy. This embodiment is particularly preferable when combined with the above mentioned formation of batches using the mechanical gripper as it allows for the control unit to infer the weight of a batch in progress with high accuracy.

The method can be implemented in the most cost effective manner when the cutting unit is a low cost cutting unit and so preferably the cutting unit comprises a cutting blade, and further preferably the blade is configured to cut in a single cutting plane. Again, here the mechanical gripper is being used in conjunction with a relatively simple cutting unit and the mechanical gripper is responsible for moving and orienting the poultry portion and enabling the cutting unit to carry out the cutting plan.

While the above aspect of the invention is designed to utilize a mechanical gripper to arrange a poultry portion such that a complex cutting device is not required, it will also be appreciated that the various preferred features discussed above introduce their own advantages such that it may be desirable to implement the method in an alternative scenario without a mechanical gripper. For example, a comparative method may comprise calculating a cutting plan and executing the cutting plan without the intervention of a mechanical gripper. A mechanical gripper may nonetheless be used after execution of the cutting plan, for example, to arrange the cut poultry portion in batches as described above.

The system has been described above with respect to scenarios in which the target weight is determined with respect to a single order, i.e. wherein the system deals with a single order for a cut poultry portion at a time. Commonly, however, the system will have multiple orders that it is aiming to fulfil simultaneously. This may be multiple orders of the same type or multiple different orders or a mixture of the two. For example, there may be an order for batches of two chicken breast fillets weighing 300 grams and there may be two batches in progress, one with an in-progress weight of 160 grams and one with an in progress weight of 155 grams. Alternatively, or additionally, the system may have two types of order, e.g. an order for batches of two chicken breast fillets weighing 300 grams and an order for single breast fillets weighing 150 grams. In scenarios such as these, it is desirable to ensure that a poultry portion is allocated to an order than enables the highest value to be extracted. Therefore, preferably, the method comprises determining a plurality of target weights, each target weight being associated with a respective order to be fulfilled, and further comprising selecting one of the plurality of target weights that best corresponds to the inspected poultry portion, wherein calculating the cutting plan is based on the selected target weight and the mass distribution of the inspected poultry portion. Here, the system effectively simulates the allocation and processing of the poultry portion in accordance with each of the orders by determining respective target weights. The system may estimate the total value that will be obtained by processing the poultry portion in accordance with each order and may select the order with the highest value as the order that will be fulfilled. Alternatively, the system may simply select the order as the one with the lowest giveaway, i.e. the expected cut poultry portion weight that least exceeds the weight required by the corresponding order.

Other factors may influence which of the target weights is selected for the poultry portion in question. Preferably, selecting one of the plurality of target weights that best corresponds to the inspected poultry portion, is based on one or more of an estimated offcut weight, a foreign object presence and/or location, a weight of one or more poultry portions located upstream of said poultry portion, a forecasted updated batch weight for one or more orders to be fulfilled (i.e. compared to the target batch weight), and a forecasted updated number of poultry portions in a batch for one or more orders to be fulfilled (i.e. compared to the target number of portions in the completed batch). Other factors that may influence the decision include the total number of each type of order to be fulfilled and the time since the last poultry portion was allocated to each order type. For example, if we have 1000 orders for batches of two chicken breast fillets weighing 300 grams and 100 orders for single breast fillets weighing 150 grams, the system may weight towards selecting for batches of two chicken breast fillets as there are more of those orders to fulfil. Alternatively, if the last five, for example, poultry portions were allocated to orders for single breast fillets weighing 150 grams, then the system may begin weighting towards batches of two chicken breast fillets to address this bias.

In accordance with a second aspect of the present invention there is provided a system comprising: a control unit adapted to determine a target weight of a cut poultry portion and to calculate a cutting plan of a poultry portion based on the target weight and a mass distribution of said poultry portion; an inspection unit adapted to inspect a poultry portion to determine the mass distribution of said poultry portion and provide said mass distribution to the control unit; a mechanical gripper adapted to grip the poultry portion and arrange said poultry portion for execution of the cutting plan; and a cutting unit adapted to cut the poultry portion in accordance with the cutting plan so as to produce a cut poultry portion in accordance with the target weight of a cut poultry portion.

It will be appreciated that all of the above describe preferred features of the first aspect of the invention apply equally to this second aspect of the invention.

In accordance with a third aspect of the present invention, there is provided a computer-readable medium comprising computer executable instructions which, when executed by a computer, cause the computer to carry out steps of: determining a target weight of a cut poultry portion; calculating a cutting plan of the poultry portion based on the target weight and a received mass distribution of the poultry portion; instructing a mechanical gripper to grip the poultry portion and arrange said poultry portion for execution of the cutting plan; instructing a cutting unit to cut the poultry portion in accordance with the cutting plan so as to produce a cut poultry portion in accordance with the target weight. Again, this aspect of the invention corresponds to the instructions that would be executed by the control unit in order to effect the method of the first aspect of the invention. Any preferred features discussed above apply equally to this aspect of the invention.

BRIEF DESCRIPTION OF THE INVENTION

The invention will now be described with reference to the accompanying drawings, in which:

FIG. 1 shows, schematically, a system for processing poultry according to an embodiment of the present invention;

FIG. 4 is a flow diagram illustrating the method implemented by the system of FIG. 1;

FIGS. 5A and 5B show, schematically, a system for processing poultry according to an embodiment of the present invention at two different stages during processing.

DETAILED DESCRIPTION OF THE INVENTION

Figure 2A:
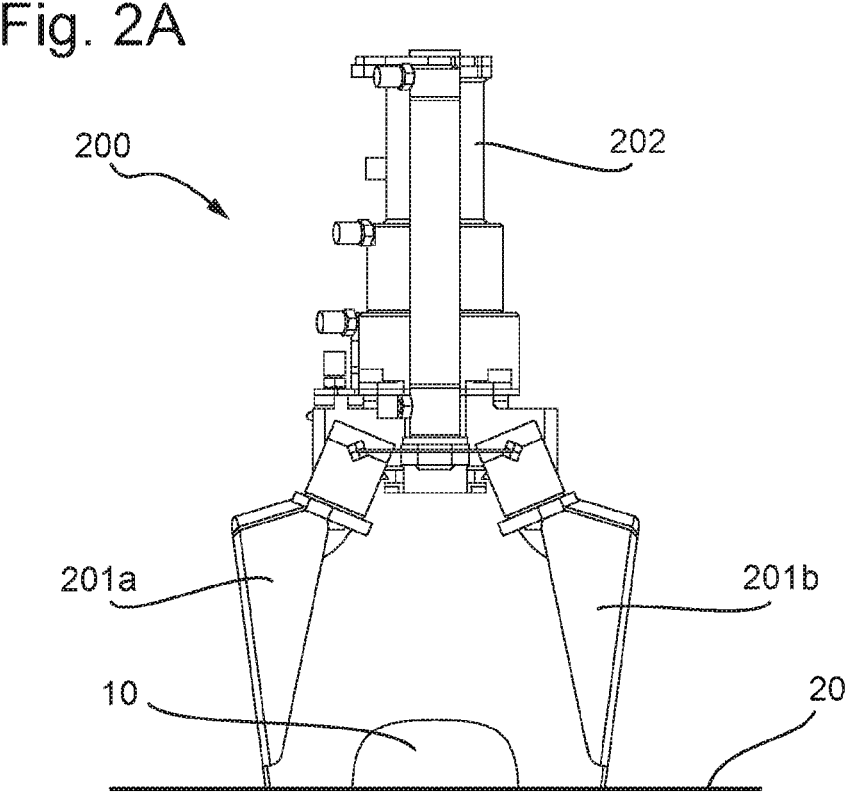
FIGS. 2A and 2B show a mechanical gripper suitable for use in the system of FIG. 1.

A first embodiment of the invention will now be described with reference to FIGS. 1 to 4.

FIG. 1 shows, schematically, a system for implementing the method of the invention. The system 1 comprises a series of conveyors 20 that convey uncut poultry portions 10, in this case chicken breast fillets, past inspection unit 100, mechanical gripper 200 and cutting unit 300 of the poultry processing system, which will be described in more detail below.

The conveyors are connected (not shown) to a control system 50 that operates all elements of the system. As shown in FIG. 4, a first step of performing the method is to input order data into the control unit 50 in step S100. In a simplest scenario, the order data may simply comprise a fixed target weight for a cut poultry portion; however, more commonly the order data includes a number of elements. For example, the order data may include orders for different types of end products, e.g. single chicken breast fillets, batches of a specified number of chicken breast fillets with specified weight, and offcut orders. Order data associated with single breast fillets may be include a target weight range, e.g. a minimum and/or maximum cut poultry portion weight, and a target, minimum and/or maximum offcut weight. Batch orders may include the target weight of each batch and/or a number or range of cut poultry portions to be included in each batch. An example batch order may be for four breast fillets at 700 grams with no individual portion being more than 200 grams or less than 150 grams. Order data may also include data concerning orders to be fulfilled using the offcut. For example, high value offcut products, such as chicken nuggets, may require a target minimum offcut weight or a target weight. While oversized offcuts could be trimmed down to meet a target offcut weight, this additional processing would decrease the cost effectiveness of the offcut and decrease the overall value extracted from the poultry portion and so a maximum offcut weight may also be included. Order data may also include data of low value offcut orders, such as processed food orders that use offcut unsuitable for more high value orders.

A poultry portion 10 entering the poultry processing system 1 is conveyed by the conveyor 20 first to an inspection unit 100. The inspection unit in this embodiment comprises an X-ray unit and may additionally comprise a weighing unit and/or a camera or other imaging unit. The elements of the inspection unit 100 gather inspection data in step S200, which comprises at least a mass distribution generated, in this case, by the X-ray unit, which is able to directly map the mass of the chicken breast fillet. The inspection data may also include details of foreign objects, such as bone pieces or blood spots, providing data concerning the presence, location, size and shape of the foreign object. The inspection data may also include a weight measured by means more accurate than the X-ray unit and data concerning the registered position of the portion 10 on the conveyor 20.

The inspection unit 100 passes the inspection data to the control unit 50 in step S300. The control unit may then use the inspection data and the order data to determine a target weight for the poultry portion in step S400. For example, the order data may include an order for four breast fillets at 700 grams with no individual portion being more than 200 grams or less than 150 grams, and also may include an order for chicken pieces, each with a weight of between 15 and 20 grams. If the poultry portion 10 is determined to have a mass of 212 grams, the control system may identify a target weight of 195 grams with 17 gram offcut so that both elements of the cut poultry portion can be used to fulfil a high value order.

Following determination of the target weight, the control unit determines a cutting plan using the target weight and the mass distribution in step S500. In this embodiment, the cutting unit cuts along a plane at a fixed angle to the conveyor, as will be described in more detail below. However, the mechanical gripper is able to arrange the poultry portion prior to cutting and so the control unit is able to evaluate a number of different positions along the poultry portion that the cutting plane might be arranged for cutting the poultry portion. The control unit identifies a position for the cut to be made that satisfies the target weight criteria.

Figure 2B:
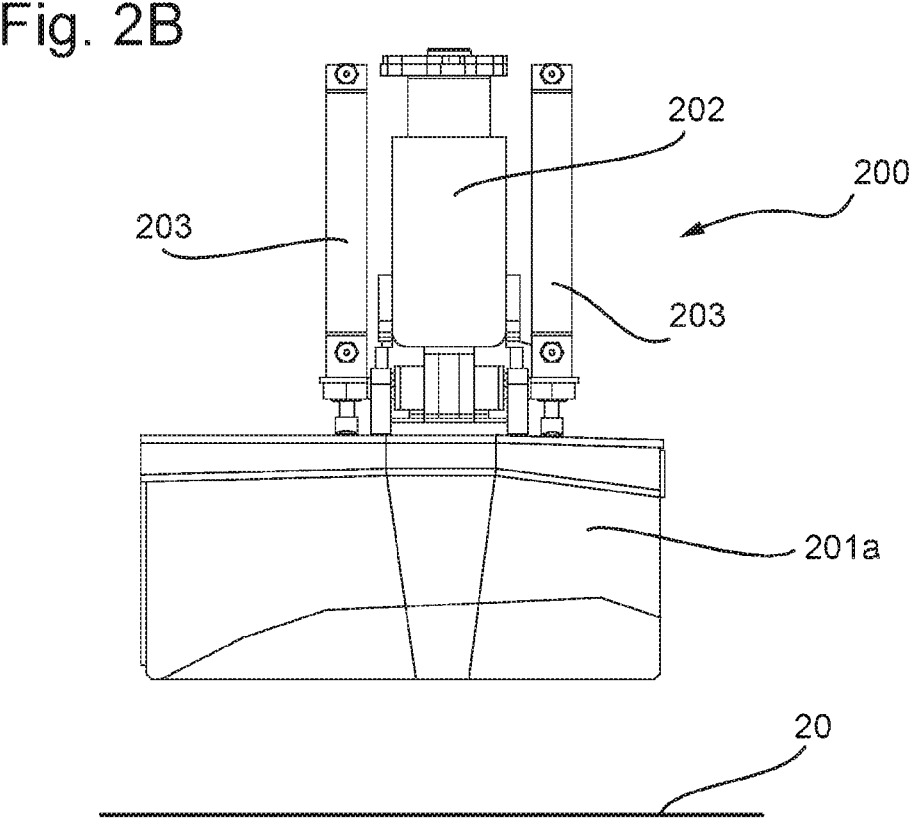

The poultry portion 10 is conveyed to mechanical gripper 200 which is shown in more detail in FIGS. 2A and 2B. The mechanical gripper 200 comprises a main supporting column 202 that and two pistons 203 arranged at opposite sides of the column 202. At the lower end of the column 202 is arranged a pair of gripping jaws comprising opposing jaw elements 201*a*, 201*b* that, in a closed position, define an elongate V-shaped channel therebetween. Each jaw element 201*a*, 201*b* is hinged at its upper end, proximate the support column, such that the lower ends of the jaws are movable to open and close the V-shaped channel. The gripper is connected at the upper end of the column 202 to a transport unit (not shown). The transport unit is able to rotate the whole gripper 200 about the central axis of the column, thereby giving the mechanical gripper 360° of rotation. The transport unit is also able to raise and lower the mechanical gripper and to effect translational motion to the gripper. The control system 50 is thereby able to arrange the gripper so that the length of the V-shaped channel is aligned with the major axis of a poultry portion 10. The gripper is then able to lower into position and close the jaws 201*a*, 201*b* to grip and collect the poultry portion. The gripper is then able to further move and rotate to change the position and orientation of the poultry portion relative to the conveyor surface, thereby effecting step S600 of FIG. 4.

Figure 3A:
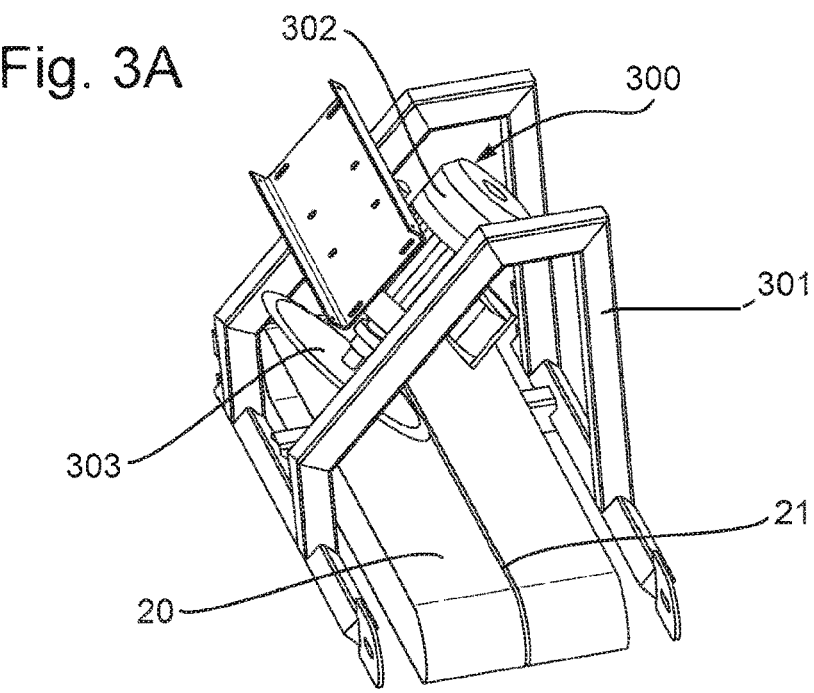
FIGS. 3A to 3C show a cutting unit suitable for use in the system of FIG. 1.
Figure 3B:
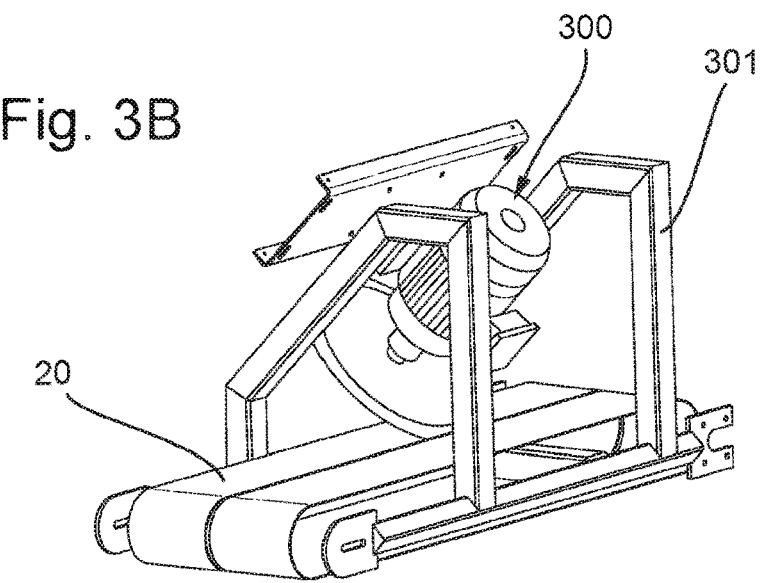
Figure 3C:
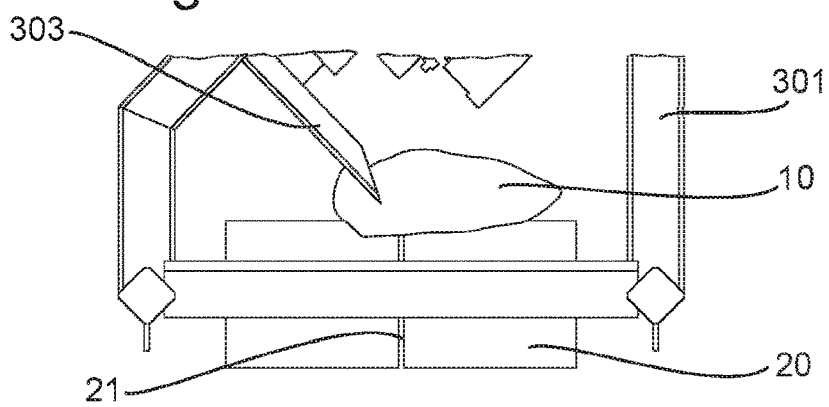

The conveyor 20 then conveys the arranged poultry portion 10 to the cutting unit 300 shown in FIGS. 3A to 3C. The cutting unit 300 comprises a support frame 301. Held over the conveyor 20 by the support frame 301 is a rotary cutting unit. The rotary cutting unit comprises a motor 302 and a rotary cutting blade 303. The motor holds the rotary cutting blade 303 at a fixed angle of 45° to the transverse dimension of the conveyor. The conveyor 20 includes a slot 21 running along the length of the conveyor and into which the rotary cutting blade 303 extends. The slot thereby prevents the blade from damaging the conveyor while allowing the blade to cut entirely through a poultry portion. FIG. 3C shows a poultry portion 10 in the process of being cut by the cutting unit 300 in step S700. The poultry portion has been arranged such that the blade makes a cut at an angle of 45° into the thicker end of the chicken breast as the conveyor 20 moves the chicken breast 10 past the stationary cutting blade. The cut at an angle of 45° into the thicker end of the chicken breast is made such that more of the inner-facing side of the chicken breast is included in the offcut than the outer-facing side. This arrangement of cut ensures that the cut chicken breast fillet looks substantially whole when the outward-facing surface of the breast is inspected.

Once the cut is made, the order data is updated to reflect that one cut poultry portion has been produced and the cut poultry portion 11 and offcut 12 are conveyed downstream for further processing, e.g. packaging. The method is repeated starting with step S200 as a subsequent poultry portion is inspected. While FIG. 4 suggests that the inspection of a new poultry portion only occurs after step S800, in practice, the method will be operated continuously and a new poultry portion will typically be inspected while a first poultry portion is being processed.

A second embodiment will now be described with reference to FIGS. 4 to 6.

FIG. 5A shows, schematically, another system for implementing the method of the invention. The system 1 comprises a series of conveyors 20 that convey uncut poultry portions 10, again chicken breast fillets, past inspection unit 100, and integrated gripping and cutting unit 250 of the poultry processing system, which will be described in more detail below. A final conveyor 20 is shown holding a tray 15 in which a batch of poultry portions will be formed by the poultry processing system.

The system again comprises a control unit 50 into which order data is input in step S100. In this embodiment, the system 1 forms batches of cut poultry portions and so the order data includes, for example, orders for two cut chicken breast fillets having a total weight of 300 grams and with each fillet having a weight no less than 125 grams and no more than 175 grams. The order data also includes data concerning the offcut products to be fulfilled, as has been described above.

A poultry portion 10 entering the poultry processing system 1 is conveyed by the conveyor 20 first to an inspection unit 100. The inspection unit comprises an X-ray unit, a weighing unit and a camera. The elements of the inspection unit 100 gather inspection data in step S200, which comprises a mass distribution generated, in this case, by the X-ray unit, a weight from the weighing unit and image data from the camera.

The inspection unit 100 passes the inspection data to the control unit 50 in step S300. The control unit may then use the inspection data and the order data to determine a target weight for the poultry portion in step S400. In this case, the inspection data includes data indicating that a bone piece 13 is included in the present poultry portion 10 and an indication that the poultry portion weighs 184 grams. In step S400, the control unit recognizes the presence of the bone piece. Since any offcut including the bone piece 13 would either be waste or require further processing to recover usable poultry, the control unit is configured to minimize the size of the offcut to reduce the amount of wasted poultry. The control unit 50 therefore determines a target weight of 170 to 175 grams, leaving an offcut of 9 to 14 grams, so as to maximize the amount of poultry used to fulfil an order.

Following determination of the target weight, the control unit 50 determines a cutting plan using the target weight, the mass distribution, and the location of the foreign object in step S500. In this embodiment, the cutting unit again cuts along a plane at a fixed angle and so the control unit 50 identifies a position for the cut to be made based on the mass distribution that satisfies the target weight criteria and that includes the bone piece 13 in the offcut portion 12.

Figure 6:
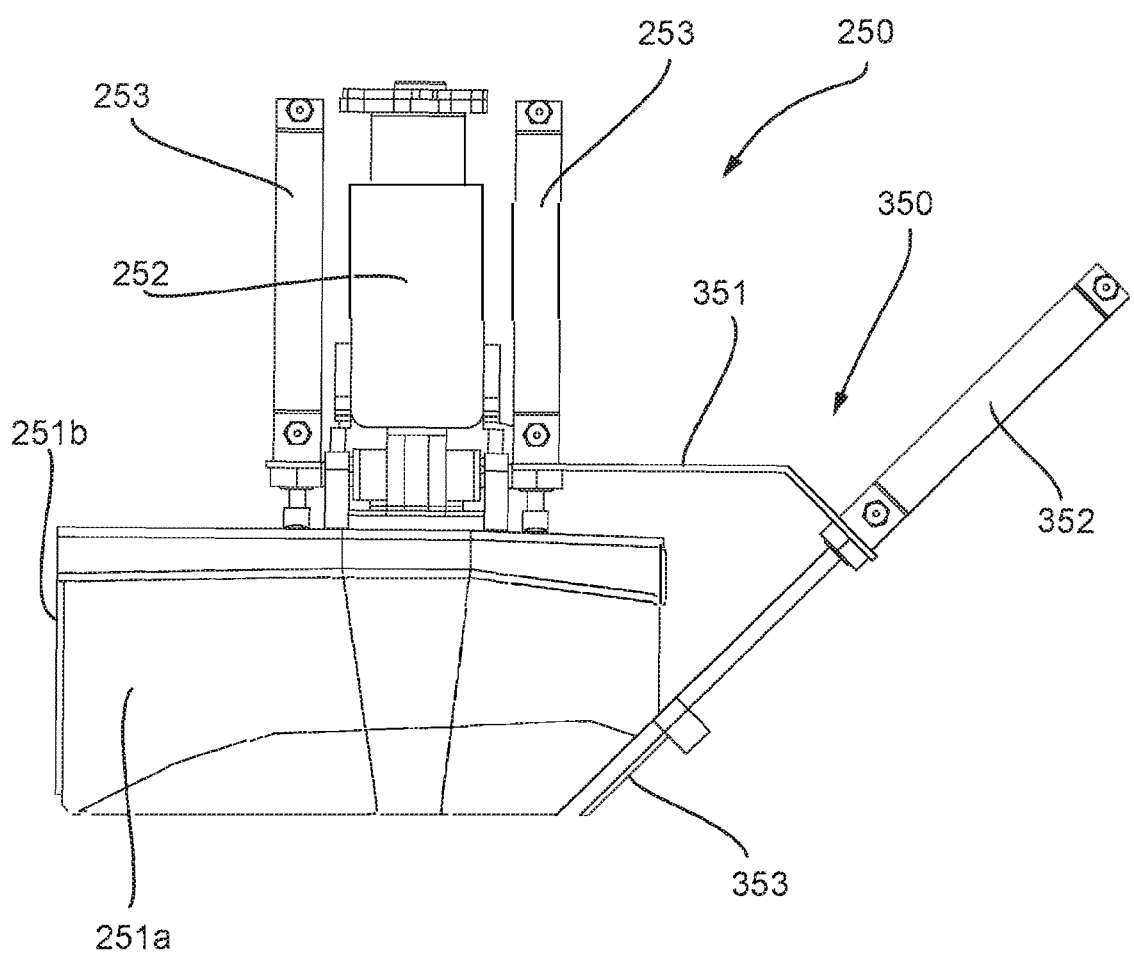
FIG. 6 shows a cutting unit suitable for use in the system of FIGS. 5A and 5B.

The poultry portion 10 is then conveyed to the integrated gripping and cutting unit 250, which is shown in more detail in FIG. 6. The integrated gripping and cutting unit 250 comprises a main supporting column 252 that and two pistons 253 arranged at opposite sides of the column 252. At the lower end of the column 252 is arranged a pair of gripping jaws comprising opposing jaw elements 251a, 251b that, in a closed position, define an elongate V-shaped channel therebetween with a beveled edge at a forward end of the channel and at the lower edge of the jaw elements 251a, 251b, which will be described further below. Each jaw element 251a, 251b is hinged at its upper end, proximate the support column, such that the lower ends of the jaws are movable to open and close the V-shaped channel. The gripper is connected at the upper end of the column 252 to a transport unit (not shown). The transport unit is able to rotate the whole gripping and cutting unit 250 about the central axis of the column 252, thereby giving the mechanical gripper 360° of rotation. The transport unit is also able to raise and lower the mechanical gripper. Finally, the transport unit is able to move the mechanical gripper along a track between a pickup location, shown in FIG. 5A, and a dispense location, shown in FIG. 5b. The pickup location is the location at which it collects the poultry portion to be cut. The dispense location will be described in more detail below.

The gripping and cutting unit 250 also comprises a cutting unit 350. The cutting unit comprises a supporting member 351 that extends from the support column 252 to an actuator 352. The actuator acts on a cutting blade 353 that is arranged at a 45° angle to the long axis of the V-shaped channel defined by the jaws 251a, 251b. The cutting blade 353, in an extended position, extends along the edge of the jaws 251a, 251b at the beveled edge. The actuator 352 operates the cutting blade 353 in a guillotine-like motion, raising and lowering the blade along the beveled edge. This motion of the blade 353 provides that a forward end of any poultry portion held in the jaws 251a, 251b receives a cut at a 45° angle, thereby making an offcut of the poultry portion.

The above-described gripping and cutting unit 250 is used to first grip the poultry portion and arrange the poultry portion in step S600, lifting the poultry portion off the conveyor, before the guillotine-like motion of the cutting blade 353 effects step S700 by cutting the poultry portion in accordance with the cutting plan. The offcut, containing the bone piece 13, falls to the conveyor 20 below. If the gripping and cutting unit 250 includes a coupling to the jaw elements 251a, 251b that is able to measure weight, the gripper may then determine an accurate weight of the cut poultry portion and provide this information to the control unit.

As shown in FIG. 5B, the gripping and cutting unit 250 is then moved by the transport unit to a separate conveyor 20, on which is arranged a tray 15. In FIG. 5B, the tray 15 is shown as being located downstream of the conveyors on which the poultry portion entered the system; however, this is merely for clarity. Typically, the tray 15 will be arranged on a parallel conveyor line, thereby allowing offcuts to proceed along downstream conveyors for further processing. The gripping and cutting unit 250 deposits the cut poultry portion 11 in the tray 15 and updates the order data to reflect that a batch in progress has one cut poultry portion 11 with a weight of 170 to 175 grams. If a weight was taken after the cut was made, this weight used to update the order data may be more accurate.

The method then reverts to step S200 for a subsequent poultry portion. Now, the control unit will use the inspection data and determine a target weight for a subsequent cut poultry portion based on the updated order data that reflects that a cut poultry portion of weight 125 to 130 grams is required.

In an alternative version of the embodiment of FIGS. 5A and 5B, a buffer zone may be included between the inspection unit 100 and the gripper unit 250 that allows the control unit to gather inspection data on multiple incoming poultry portions. If for example, such a system were in an operational state as described above, i.e. with an order for batches of two cut chicken breast fillets having a total weight of 300 grams and with each fillet having a weight no less than 125 grams and no more than 175 grams, the control unit may use this buffer zone to better fulfil the order. For example, the control unit may recognize a first poultry portion with a weight of 184 grams and a second poultry portion with a weight of 200 grams. On this basis, the control unit may determine that the first poultry portion should be cut down to, for example, 140 grams, to reduce the size of the offcut that needs to be made on the second poultry portion with a weight of 200 grams and ensure that both offcuts can be used for high value offcut products without significant further processing.

The invention claimed is:

1. A method of processing fish portions, the method comprising:
   determining at a control unit a target weight of a cut fish portion;
   inspecting a fish portion using an inspection unit to determine a mass distribution of said fish portion and providing said mass distribution to the control unit;
   calculating a cutting plan of the fish portion based on the target weight and the mass distribution using the control unit;
   using a mechanical gripper so as to grip the fish portion and arrange said fish portion for execution of the cutting plan; and
   cutting the fish portion using a cutting unit in accordance with the cutting plan so as to produce a cut fish portion in accordance with the target weight.

2. A method according to claim 1, wherein the method comprises forming a batch of fish portions, and wherein the target weight is determined based on a target batch weight and a weight of a present incomplete batch.

3. A method according to claim 2, further comprising determining at the control unit a new target weight for a subsequent cut fish portion, said new target weight being determined based on at least the target batch weight and an updated weight of a present incomplete batch, and optionally based on a target number of fish portions in said batch and an updated number of fish portions in said present incomplete batch and further optionally based on a weight of a subsequent fish portion and/or a weight of one or more fish portions located upstream of said subsequent fish portion.

4. A method according to claim 2, wherein the target weight is determined based on a target number of fish portions in said batch and a number of fish portions in said present incomplete batch.

5. A method according to claim 2, wherein the target weight is determined based on a weight of said fish portion and/or based on a weight of one or more fish portions located upstream of said fish portion.

6. A method according to claim 1, wherein determining the target weight is based on a minimum and/or maximum cut fish portion weight.

7. A method according to claim 1, wherein the inspection unit comprises a weighing unit and inspecting the fish portion comprises weighing said fish portion with the weighing unit.

8. A method according to claim 1, wherein the inspection unit comprises a scanning unit and inspecting the fish portion comprises scanning said fish portion with the scanning unit, wherein said scanning unit is preferably an ultrasound unit or an x-ray unit.

9. A method according to claim 1, further comprising inspecting the fish portion so as to identify a predetermined anatomical region of said fish portion, and calculating the cutting plan based on the mass distribution and the predetermined anatomical region.

10. A method according to claim 9, wherein calculating the cutting plan comprises identifying a cutting line within the predetermined anatomical region that produces a cut fish portion that meets the target weight.

11. A method according to claim 1, further comprising inspecting the fish portion so as to identify a major axis of the fish portion and wherein calculating the cutting plan comprises calculating a cutting line relative to the major axis.

12. A method according to claim 1, wherein arranging said fish portion for execution of the cutting plan comprises moving said fish portion relative to the cutting unit.

13. A method according to claim 1, comprising cutting the fish portion while said fish portion is gripped by the mechanical gripper.

14. A method according to claim 1, wherein the mechanical gripper comprises a weighing unit and further comprising weighing the cut fish portion with the mechanical gripper after execution of the cutting plan.

15. A method according to claim 1, wherein the cutting unit is configured to cut along a predetermined cutting direction and wherein gripping said fish portion comprises arranging said fish portion relative to the predetermined cutting direction such that the cutting unit is able to cut said fish portion in accordance with the cutting plan.

16. A method according to claim 1, comprising gripping the fish portion at a pickup location using the mechanical gripper and further comprising depositing the cut fish portion at a deposit location, separate from the pickup location, using the mechanical gripper.

17. A method according to claim 16, wherein the method comprises forming a batch of fish portions and wherein the deposit location is a package for the batch of fish portions.

18. A method according to claim 1, comprising determining a plurality of target weights, each target weight being associated with a respective order to be fulfilled, and further comprising selecting one of the plurality of target weights that best corresponds to the inspected fish portion, wherein calculating the cutting plan is based on the selected target weight and the mass distribution of the inspected fish portion.

19. A system for processing fish portions, the system comprising:
   a control unit adapted to determine a target weight of a cut fish portion and to calculate a cutting plan of a fish portion based on the target weight and a mass distribution of said fish portion;
   an inspection unit adapted to inspect a fish portion to determine the mass distribution of said fish portion and provide said mass distribution to the control unit;
   a mechanical gripper adapted to grip the fish portion and arrange said fish portion for execution of the cutting plan; and
   a cutting unit adapted to cut the fish portion in accordance with the cutting plan so as to produce a cut fish portion in accordance with the target weight of a cut fish portion.

20. A computer-readable medium comprising computer executable instructions which, when executed by a computer, cause the computer to carry out steps of:
   determining a target weight of a cut fish portion;
   calculating a cutting plan of the fish portion based on the target weight and a received mass distribution of the fish portion;
   instructing a mechanical gripper to grip the fish portion and arrange said fish portion for execution of the cutting plan;
   instructing a cutting unit to cut the fish portion in accordance with the cutting plan so as to produce a cut fish portion in accordance with the target weight.

* * * * *